UNITED STATES PATENT OFFICE.

HUGO WITTER, OF LEVERKUSEN, NEAR COLOGNE, GERMANY, ASSIGNOR TO FARBENFABRIKEN, VORM. FRIEDR. BAYER & CO., OF ELBERFELD, GERMANY, A CORPORATION OF GERMANY.

RED TETRAZO DYE.

No. 842,048.          Specification of Letters Patent.          Patented Jan. 22, 1907.

Application filed October 15, 1906. Serial No. 339,024.

*To all whom it may concern:*

Be it known that I, HUGO WITTER, a citizen of the German Empire, residing at Leverkusen, near Cologne, Kingdom of Prussia, Germany, have invented new and useful Improvements in Red Tetrazo Dye, of which the following is a specification.

My invention relates to the preparation of a new tetrazo dyestuff which is obtained by combining one molecule of the tetrazo compound of benzidin with one molecule of 2-naphthylamin-3.6-disulfonic acid and (in acid solution) with one molecule of 2-amino-8-naphthol-6-sulfonic acid, or vice versa. The dye thus obtained dyes cotton bluish-red shades remarkable for good fastness to light.

In order to illustrate my invention, the following example is given, the parts being by weight: 18.4 parts of benzidin are diazotized in the usual manner by means of 13.8 parts of sodium nitrite and the necessary quantity of hydrochloric acid. The resulting tetrazo compound is then introduced into a well-cooled solution of thirty-one parts of 2-naphthylamin-3.6-disulfonic acid containing an excess of sodium acetate. When the formation of the intermediate compound is complete, a neutral solution of twenty-four parts of 2-amino-8-naphthol-6-sulfonic is added, and the mixture is stirred for some time and is then heated to 30° centigrade until no more diazo compound can be found. It is rendered alkaline by the addition of sodium carbonate, and the dyestuff is precipitated by the addition of common salt, filtered off, and dried. It dyes cotton clear bluish-red shades.

The process is carried out in an analogous manner by combining the tetrazo compound at first with the 2-amino-8-naphthol-6-sulfonic acid and then with the 2-naphthylamin-3.6-disulfonic acid.

The new tetrazo dyestuff is after being dried and pulverized in the shape of its sodium salt a dark powder soluble in water with a bluish-red color and in concentrated sulfuric acid with a greenish-blue color. It dyes cotton bluish-red shades fast to light and yields upon reduction with stannous chlorid and hydrochloric acid para-para-diaminodiphenyl, 1.2-diamino-8-naphthol-6-sulfonic acid and 1.2-naphthylen-diamin-3.6-disulfonic acid.

Having now described my invention and in what manner the same is to be performed, what I claim as new, and desire to secure by Letters Patent, is—

The herein-described tetrazo dyestuff obtainable by combining tetrazotized benzidin with one molecule of 2-naphthylamin-3.6-disulfonic acid and in acid solution with one molecule of 2-amino-8-naphthol-6-sulfonic acid, which dyestuff is, after being dried and pulverized, in the shape of its sodium salt a dark powder soluble in water with a bluish-red color and in concentrated sulfuric acid with a greenish-blue color; dyeing cotton bluish-red shades; and yielding upon reduction with stannous chlorid and hydrochloric acid para-para-diaminodiphenyl, 1.2-diamino-8-naphthol-6-sulfonic acid and 1.2-naphthylen-diamin-3.6-disulfonic acid, substantially as hereinbefore described.

In testimony whereof I have hereunto set my hand in the presence of two subscribing witnesses.

HUGO WITTER. [L. S.]

Witnesses:
   OTTO KÖNIG,
   J. A. RITTERSHAUS.